United States Patent
Takase (10) Patent No.: US 9,772,014 B2
(45) Date of Patent: Sep. 26, 2017

(54) STEERING APPARATUS OF OUTBOARD MOTOR AND OUTBOARD MOTOR BOAT

(71) Applicant: YAMAHA HATSUDOKI KABUSHIKI KAISHA, Iwata-shi, Shizuoka (JP)

(72) Inventor: Hiroaki Takase, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 146 days.

(21) Appl. No.: 14/872,252

(22) Filed: Oct. 1, 2015

(65) Prior Publication Data
US 2016/0201776 A1    Jul. 14, 2016

(30) Foreign Application Priority Data

Jan. 13, 2015    (JP) ................ 2015-004298

(51) Int. Cl.
| B63H 20/10 | (2006.01) |
| F16H 25/22 | (2006.01) |
| B63H 20/12 | (2006.01) |
| B63H 25/02 | (2006.01) |
| F16H 21/44 | (2006.01) |
| F16H 25/20 | (2006.01) |

(52) U.S. Cl.
CPC ......... *F16H 25/2204* (2013.01); *B63H 20/10* (2013.01); *B63H 20/12* (2013.01); *B63H 25/02* (2013.01); *F16H 21/44* (2013.01); *F16H 25/22* (2013.01); *F16H 2025/2043* (2013.01)

(58) Field of Classification Search
CPC ...... B63H 20/12; B63H 21/265; B63H 25/02; F16H 25/2204; F16H 2025/2043
See application file for complete search history.

(56) References Cited

U.S. PATENT DOCUMENTS

| 4,373,920 | A | * | 2/1983 | Hall ................. B63H 21/265 |
| | | | | 440/59 |
| 5,997,370 | A | | 12/1999 | Fetchko et al. |
| 7,311,571 | B1 | | 12/2007 | Swan et al. |
| 7,736,206 | B1 | | 6/2010 | McChesney et al. |
| 8,840,439 | B1 | | 9/2014 | Wiatrowski et al. |

FOREIGN PATENT DOCUMENTS

| JP | 2006-306175 A | 11/2006 |
| JP | 2006-306176 A | 11/2006 |

* cited by examiner

*Primary Examiner* — Edwin Swinehart
(74) *Attorney, Agent, or Firm* — Keating and Bennett, LLP (57) ABSTRACT

A steering apparatus for an outboard motor includes a steering mechanism including a guide arranged forward relative to and parallel or substantially parallel to a tilt shaft, a moving body that is rotatably coupled to an arm through a first pivot shaft parallel or substantially parallel to the tilt shaft and movable along the guide, and a support bracket that supports the guide such that the guide rotates about a second pivot shaft parallel or substantially parallel to the tilt shaft and offset relative to the tilt shaft.

17 Claims, 8 Drawing Sheets

WHEN STEERING APPARATUS IS TILTED DOWN

WHEN STEERING APPARATUS IS TILTED UP

MODIFICATION

STEERING APPARATUS OF OUTBOARD MOTOR AND OUTBOARD MOTOR BOAT

CROSS-REFERENCE TO RELATED APPLICATION

This application claims priority to Patent Application No. 2015-004298 filed in Japan on Jan. 13, 2015, the entire contents of which are hereby incorporated by reference.

BACKGROUND OF THE INVENTION

1. Field of the Invention

The present invention relates to a steering apparatus for an outboard motor and an outboard motor boat.

2. Description of the Related Art

A steering apparatus for an outboard motor is known in general. Such a steering apparatus for an outboard motor is disclosed in Japanese Patent Laid-Open No. 2006-306175, for example.

Japanese Patent Laid-Open No. 2006-306175 discloses an electric power steering device of a marine propulsion device (a steering apparatus for an outboard motor) including a clamp bracket fixed to a boat body, a swivel bracket rotatably supported by the clamp bracket through a tilt shaft, a worm wheel rotatably supported by the swivel bracket through a steering shaft, and a worm gear that is arranged on an upper portion of the tilt shaft and meshes with the worm wheel. In the electric power steering device of the marine propulsion device according to Japanese Patent Laid-Open No. 2006-306175, the worm gear arranged on the upper portion of the tilt shaft is configured to be rotated together with the marine propulsion device about the tilt shaft when the marine propulsion device is tilted up.

In the electric power steering device of the marine propulsion device (the steering apparatus of the outboard motor) according to Japanese Patent Laid-Open No. 2006-306175, however, the worm gear is arranged on the upper portion of the tilt shaft, and hence an upper cover above the tilt shaft is arranged to avoid the worm gear. Thus, a distance from the upper cover to the tilt shaft is increased. Consequently, the rotation radius of the upper cover arranged to avoid the worm gear is increased when the marine propulsion device is tilted up, and hence an overhang of the marine propulsion device in the boat is disadvantageously increased when the marine propulsion device (outboard motor) is tilted up.

SUMMARY OF THE INVENTION

Preferred embodiments of the present invention have been provided in order to solve the above problems, and preferred embodiments of the present invention provide a steering apparatus for an outboard motor and an outboard motor boat that significantly reduce or prevent an increase in an overhang of an outboard motor in the boat when the outboard motor is tilted up.

A steering apparatus for an outboard motor according to a first preferred embodiment of the present invention includes a clamp bracket configured to be fixed to a boat body, a swivel bracket rotatably supported by the clamp bracket through a tilt shaft that extends horizontally or substantially horizontally, a steering arm rotatably supported by the swivel bracket through a steering shaft orthogonal or substantially orthogonal to the tilt shaft, and a steering mechanism coupled to the steering arm. The steering arm includes a mount that supports the outboard motor and an arm that extends from the mount toward the boat body and is coupled to the steering mechanism, and the steering mechanism includes a guide arranged forward relative to, and parallel or substantially parallel to, the tilt shaft, a moving body that is rotatably coupled to the arm through a first pivot shaft parallel or substantially parallel to the tilt shaft and moves along the guide, and a support bracket that supports the guide such that the guide rotates about a second pivot shaft parallel or substantially parallel to the tilt shaft and offset relative to the tilt shaft.

In the steering apparatus for an outboard motor according to a preferred embodiment of the present invention, the guide is arranged forward relative to and parallel or substantially parallel to the tilt shaft. Thus, no space to arrange the guide is provided above the tilt shaft, and hence an increase in a distance from the tilt shaft to an upper cover of the outboard motor is significantly reduced or prevented. Consequently, an increase in an overhang of the outboard motor in a boat is significantly reduced or prevented when the outboard motor is tilted up. The support bracket is provided to support the guide such that the guide rotates about the second pivot shaft parallel or substantially parallel to the tilt shaft. Thus, the guide is rotated about the second pivot shaft offset relative to the tilt shaft when the outboard motor is tilted up, and hence the outboard motor is tilted up while the guide arranged forward relative to the tilt shaft is folded around the second pivot shaft. Consequently, the outboard motor is easily fully tilted up while interference of the guide forward relative to the tilt shaft with the boat body is significantly reduced or prevented.

In the steering apparatus for an outboard motor according to a preferred embodiment of the present invention, the second pivot shaft is preferably offset downward relative to the tilt shaft. According to this structure, the guide is rotated about the second pivot shaft offset downward relative to the tilt shaft such that the interference of the guide with the boat body is easily significantly reduced or prevented.

In the steering apparatus for an outboard motor according to a preferred embodiment of the present invention, the second pivot shaft is preferably offset forward and downward relative to the tilt shaft. According to this structure, the guide is rotated about the second pivot shaft offset forward and downward relative to the tilt shaft such that the interference of the guide with the boat body is more easily significantly reduced or prevented.

In the steering apparatus for an outboard motor according to a preferred embodiment of the present invention, the second pivot shaft is preferably fixed to the boat body. According to this structure, the guide is rotated about the second pivot shaft fixed to the boat body when the outboard motor is tilted up, and hence the interference of the guide with the boat body is easily significantly reduced or prevented even when the outboard motor is fully tilted up.

In this case, the second pivot shaft is preferably fixed to the boat body by a fixing member that fixes the clamp bracket to the boat body. According to this structure, an increase in the number of components is significantly reduced or prevented as compared with the case where a member that fixes the second pivot shaft is provided separately. No mounting hole is provided separately in the boat body to fix the second pivot shaft, and hence the second pivot shaft is easily mounted.

In the steering apparatus for an outboard motor according to a preferred embodiment of the present invention, the arm preferably includes a first arm connected to the mount and a second arm rotatably coupled to the first arm through a rotation shaft orthogonal or substantially orthogonal to the first pivot shaft and coupled to the moving body through the first pivot shaft. According to this structure, the second arm rotates about the first pivot shaft in a horizontal or substantially horizontal direction, and hence linear movement of the moving body along the guide is converted to rotational movement of the first arm by the rotation shaft while a distance from the first arm to the moving body is adjusted. Consequently, the outboard motor is easily turned by the linear movement of the moving body.

In the steering apparatus for an outboard motor according to a preferred embodiment of the present invention, the moving body preferably includes an arm relief that prevents interference of a tip end of the arm when the moving body is rotated with respect to the arm. According to this structure, interference between the tip end of the arm and the moving body is significantly reduced or prevented when the outboard motor is tilted up, and hence the tilt-up angle is further increased.

In the steering apparatus for an outboard motor according to a preferred embodiment of the present invention, the steering mechanism preferably further includes a hydraulic mechanism that drives the moving body. According to this structure, the outboard motor is easily turned by the hydraulic mechanism.

In the steering apparatus for an outboard motor according to a preferred embodiment of the present invention, the steering mechanism preferably further includes an electric actuator that drives the moving body. According to this structure, the outboard motor is easily turned by the electric actuator.

In the structure in which the steering mechanism includes the electric actuator, the output axis of the electric actuator is preferably arranged coaxially with the guide. According to this structure, interference of the electric actuator with the boat body is significantly reduced or prevented when the outboard motor is tilted up, unlike the case where the output axis of the electric actuator is largely spaced apart in a direction orthogonal to the axis of the guide.

In this case, the guide preferably includes a ball screw, and the moving body preferably includes a ball nut. According to this structure, the moving body is easily moved by rotation of the ball screw of the guide.

In the structure in which the steering mechanism includes the electric actuator, the electric actuator preferably overlaps with a portion of the outboard motor in a side elevational view when the outboard motor is fully tilted up. According to this structure, the tilt-up angle of the outboard motor is increased as compared with the case where a portion of the outboard motor does not overlap with the electric actuator in the side elevational view.

In the steering apparatus for an outboard motor according to a preferred embodiment of the present invention, the support bracket is preferably rotatable downward about the second pivot shaft when the outboard motor is fully tilted up. According to this structure, the guide is moved downward by the downward rotation of the support bracket when the outboard motor is fully tilted up, and hence interference of the guide with the outboard motor arranged above the guide is easily significantly reduced or prevented.

In this case, the rotation angle of the support bracket about the tilt shaft is preferably smaller than the rotation angle of the swivel bracket about the tilt shaft when the outboard motor is fully tilted up. According to this structure, the interference of the guide supported by the support bracket with the boat body is effectively significantly reduced or prevented when the outboard motor is fully tilted up.

In the steering apparatus for an outboard motor according to a preferred embodiment of the present invention, the rotation radius of the guide about the second pivot shaft is preferably smaller than the length of the arm. According to this structure, the guide is rotated in a space-saving manner when the outboard motor is tilted up, and hence a large space is ensured in the boat while an increase in a region where the guide is moved is significantly reduced or prevented.

In the steering apparatus for an outboard motor according to a preferred embodiment of the present invention, the support bracket preferably includes a pair of support brackets provided on both ends of the guide. According to this structure, both ends of the guide are supported by the pair of support brackets, and hence the guide is securely supported.

An outboard motor boat according to a second preferred embodiment of the present invention includes a boat body and a steering apparatus for an outboard motor mounted on the boat body. The steering apparatus of the outboard motor includes a clamp bracket fixed to the boat body, a swivel bracket rotatably supported by the clamp bracket through a tilt shaft that extends horizontally or substantially horizontally, a steering arm rotatably supported by the swivel bracket through a steering shaft orthogonal or substantially orthogonal to the tilt shaft, and a steering mechanism coupled to the steering arm. The steering arm includes a mount that supports the outboard motor and an arm that extends from the mount toward the boat body and is coupled to the steering mechanism, and the steering mechanism includes a guide arranged forward relative to and parallel or substantially parallel to the tilt shaft, a moving body that is rotatably coupled to the arm through a first pivot shaft parallel or substantially parallel to the tilt shaft and configured to move along the guide, and a support bracket that supports the guide such that the guide rotates about a second pivot shaft parallel or substantially parallel to the tilt shaft and offset relative to the tilt shaft.

In the outboard motor boat according to the second preferred embodiment of the present invention, the guide is arranged forward relative to and parallel or substantially parallel to the tilt shaft. Thus, no space to arrange the guide is provided above the tilt shaft, and hence an increase in a distance from the tilt shaft to an upper cover of the outboard motor is significantly reduced or prevented. Consequently, an outboard motor boat is provided that significantly reduces or prevents an increase in an overhang of the outboard motor in the boat when the outboard motor is tilted up. A support bracket is provided that supports the guide such that the guide rotates about the second pivot shaft parallel or substantially parallel to the tilt shaft. Thus, the guide is rotated about the second pivot shaft offset relative to the tilt shaft when the outboard motor is tilted up, and hence the outboard motor is tilted up while the guide arranged forward relative to the tilt shaft is folded around the second pivot shaft. Consequently, an outboard motor boat is provided in which the outboard motor is easily fully tilted up while interference of the guide arranged forward relative to the tilt shaft with the boat body is significantly reduced or prevented provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of an outboard motor boat 100 according to preferred embodiments of the present invention is now described with reference to FIGS. 1 to 8. In the figures, arrow FWD represents the forward movement direction of the outboard motor boat 100, and arrow BWD represents the reverse movement direction of the outboard motor boat 100. In the figures, arrow R represents the starboard direction of the outboard motor boat 100, and arrow L represents the portside direction of the outboard motor boat 100.

Figure 1:
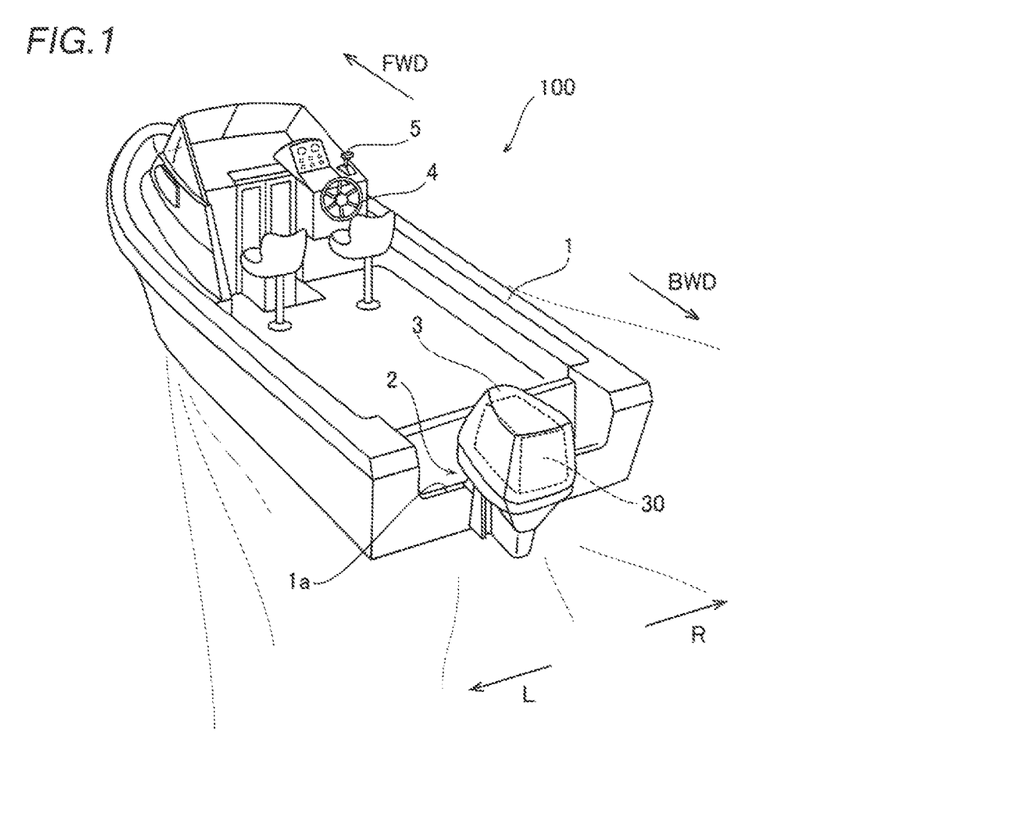
FIG. 1 is a perspective view showing an outboard motor boat according to a preferred embodiment of the present invention.
Figure 2:
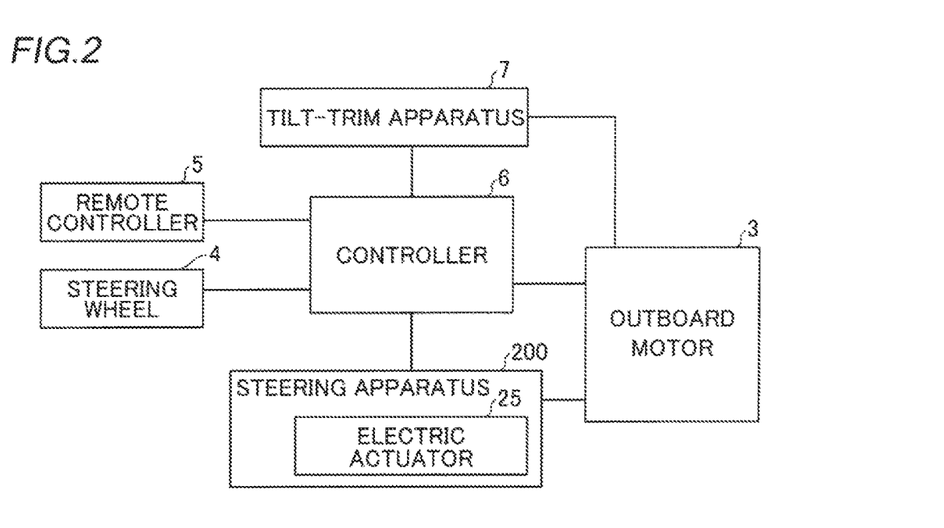
FIG. 2 is a block diagram schematically showing the outboard motor boat according to a preferred embodiment of the present invention.

The outboard motor boat 100 includes a boat body 1, a steering mechanism 2, an outboard motor 3, a steering wheel 4, and a remote controller 5, as shown in FIG. 1. The outboard motor boat 100 further includes a controller 6 and a tilt-trim apparatus 7, as shown in FIG. 2. As shown in FIG. 1, the boat body 1 includes a transom 1a arranged in a rear portion thereof.

Figure 3:
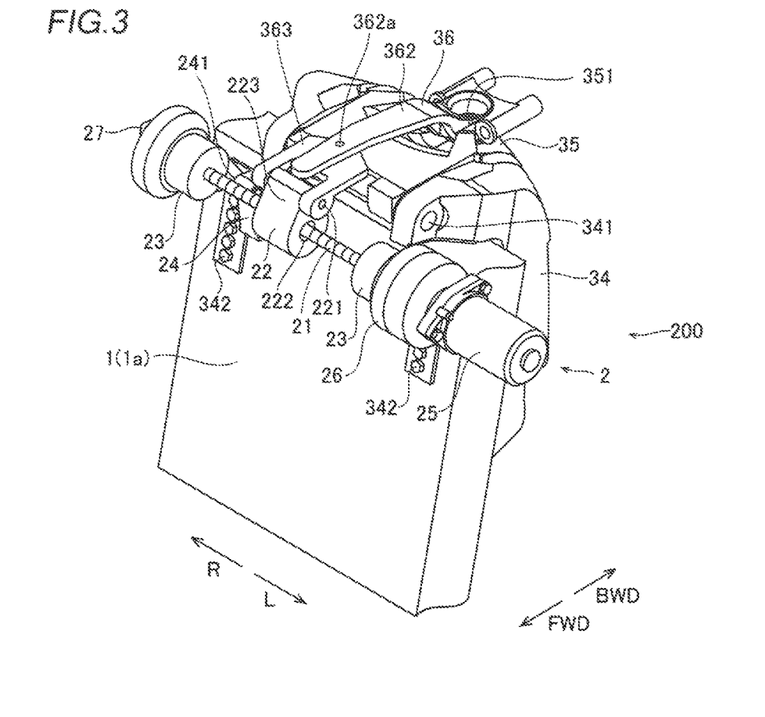
FIG. 3 is a perspective view showing a steering apparatus according to a preferred embodiment of the present invention.

The steering mechanism 2 turns the outboard motor 3. As shown in FIG. 3, the steering mechanism 2 includes a guide 21, a moving body 22, support brackets 23, mounting members 24, an electric actuator 25, a speed reducer 26, and a sensor 27. The moving body 22 includes a first pivot shaft 221, a ball nut 222, and an arm relief portion 223. The mounting members 24 include second pivot shafts 241 (see FIGS. 7 and 8).

Figure 4:
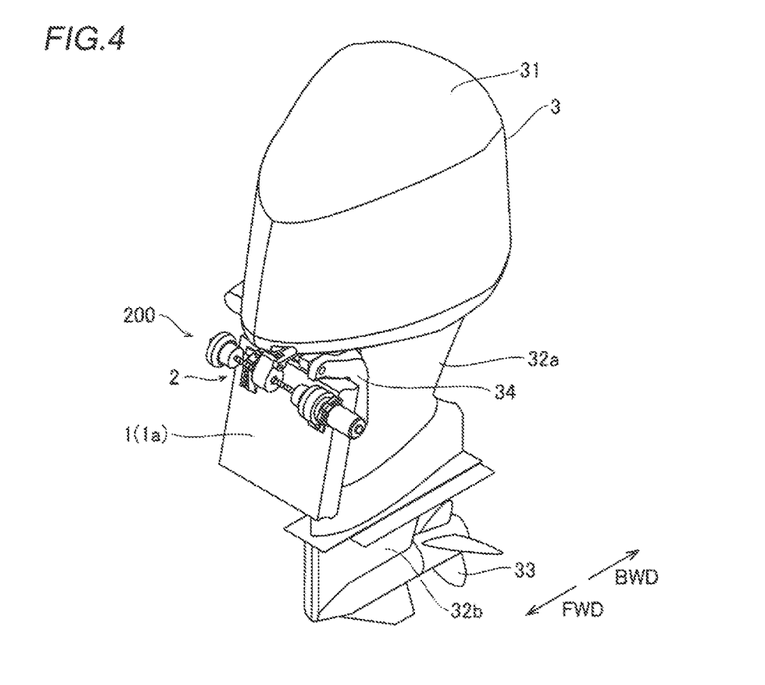
FIG. 4 is a perspective view showing the steering apparatus and an outboard motor according to a preferred embodiment of the present invention.
Figure 5:
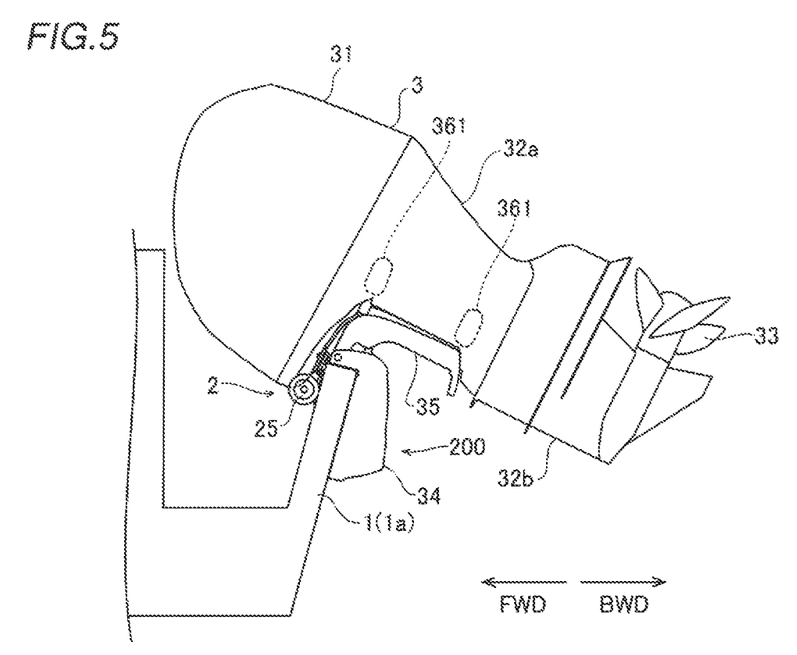
FIG. 5 is a side elevational view showing a state where the outboard motor provided with the steering apparatus according to a preferred embodiment of the present invention is tilted up.

The outboard motor 3 is mounted on the transom 1a arranged in the rear portion of the boat body 1. The outboard motor 3 includes an engine 30, as shown in FIG. 1. As shown in FIGS. 4 and 5, the outboard motor 3 includes an engine case (cowling) 31, an upper case 32a, a lower case 32b, a propeller 33, clamp brackets 34, a swivel bracket 35, and a steering arm 36 (see FIG. 3). The clamp brackets 34 include tilt shafts 341 and fixing members 342. The swivel bracket 35 includes a steering shaft 351. The steering arm 36 includes a mount 361, a first arm 362, and a second arm 363. The first arm 362 and the second arm 363 are examples of the "arm" in a preferred embodiment of the present invention.

As shown in FIG. 3, a steering apparatus 200 that turns the outboard motor 3 includes the steering mechanism 2, the clamp brackets 34, the swivel bracket 35, and the steering arm 36. The steering apparatus 200 is an example of the "steering apparatus for an outboard motor" in a preferred embodiment of the present invention.

As shown in FIG. 2, the steering apparatus 200 (steering mechanism 2) turns (rotates right and left) the outboard motor 3 by control of the controller 6 based on the of operation of the steering wheel 4. The output (throttle position) of the engine 30 of the outboard motor 3 is controlled by the controller 6 based on the operation of the remote controller 5. The tilt angle and trim angle of the outboard motor 3 are changed by the tilt-trim apparatus 7 based on the user's operation.

The guide 21 of the steering mechanism 2 is arranged forward relative to the tilt shafts 341 and parallel or substantially parallel to the tilt shafts 341. The guide 21 includes a ball screw. The guide 21 extends linearly. In other words, the guide 21 is arranged parallel or substantially parallel to a mounting surface of the transom 1a in the rear portion of the boat body 1. The guide 21 guides movement of the moving body 22.

Figure 7:
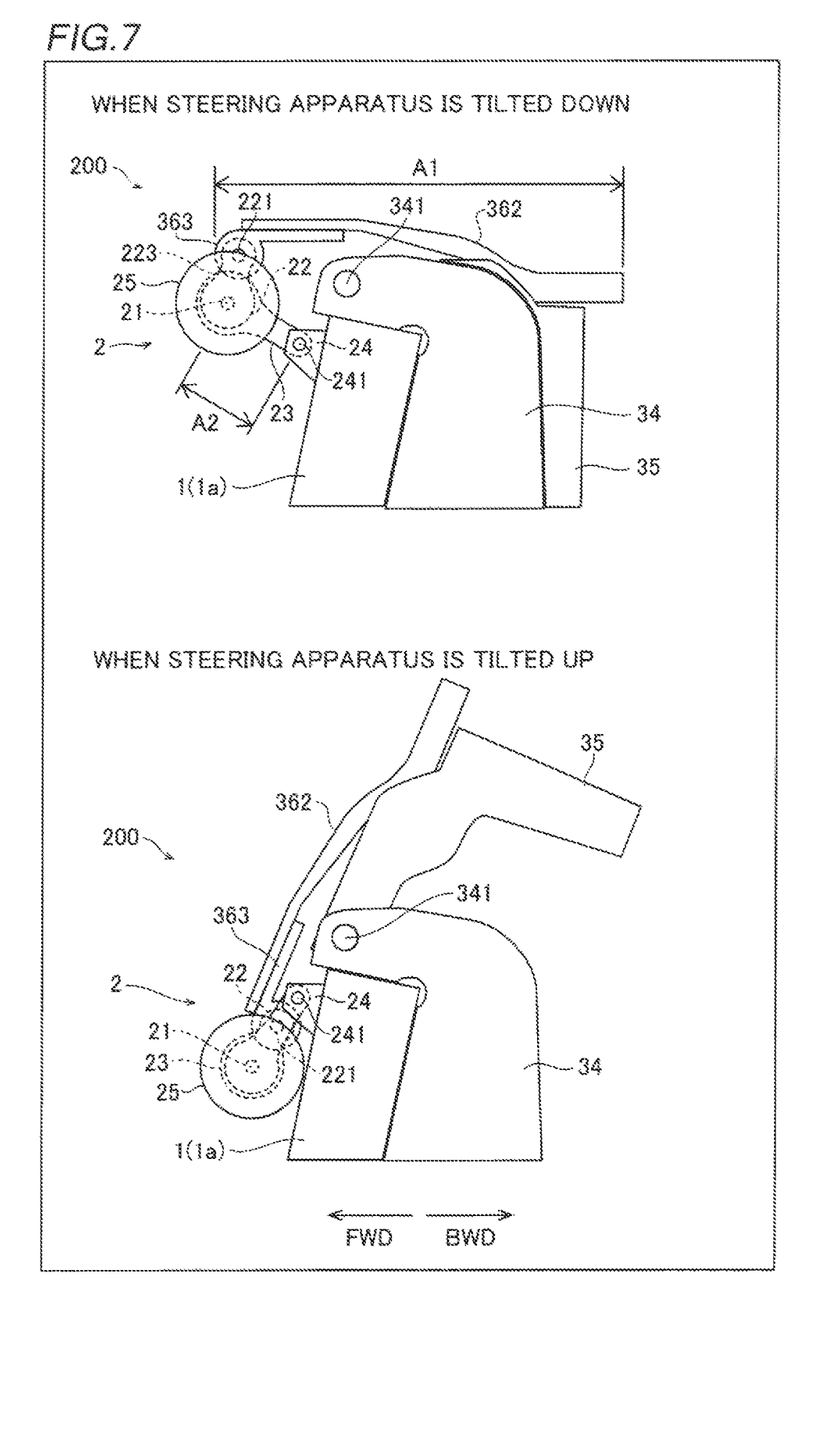
FIG. 7 illustrates states where the steering apparatus of the outboard motor according to a preferred embodiment of the present invention is tilted down and tilted up.
Figure 8:
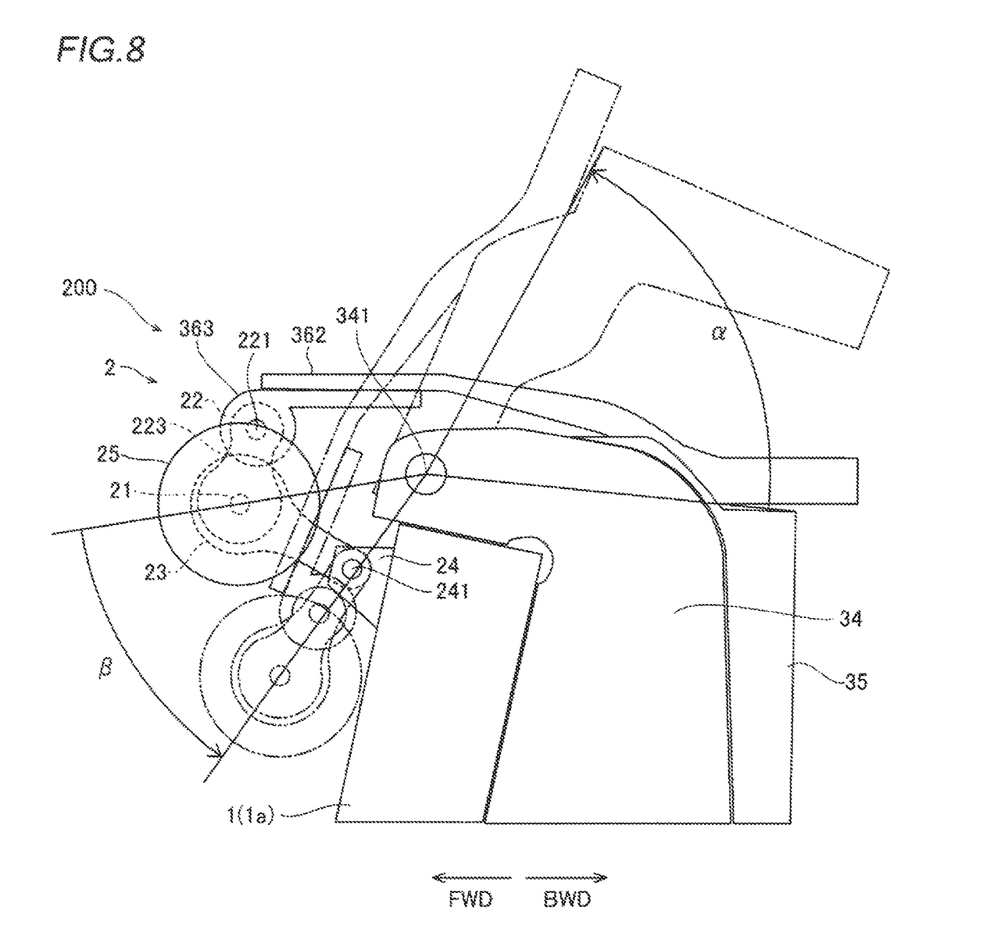
FIG. 8 illustrates movement of the steering apparatus when the outboard motor according to a preferred embodiment of the present invention is tilted up.

The moving body 22 is rotatably coupled to the second arm 363 through the first pivot shaft 221 parallel or substantially parallel to the tilt shafts 341. The moving body 22 is configured to move along the guide 21. Specifically, the ball nut 222 of the moving body 22 engages with the ball screw of the guide 21. The moving body 22 moves in a right-left direction along the guide 21 by rotation of the ball screw of the guide 21. In other words, the moving body 22 moves parallel or substantially parallel to the mounting surface of the transom 1a in the rear portion of the body portion 1 along the guide 21. As shown in FIGS. 7 and 8, the arm relief 223 of the moving body 22 is recessed to prevent interference of a tip end of the first arm 362 when the moving body 22 is rotated with respect to the first arm 362.

Figure 6:
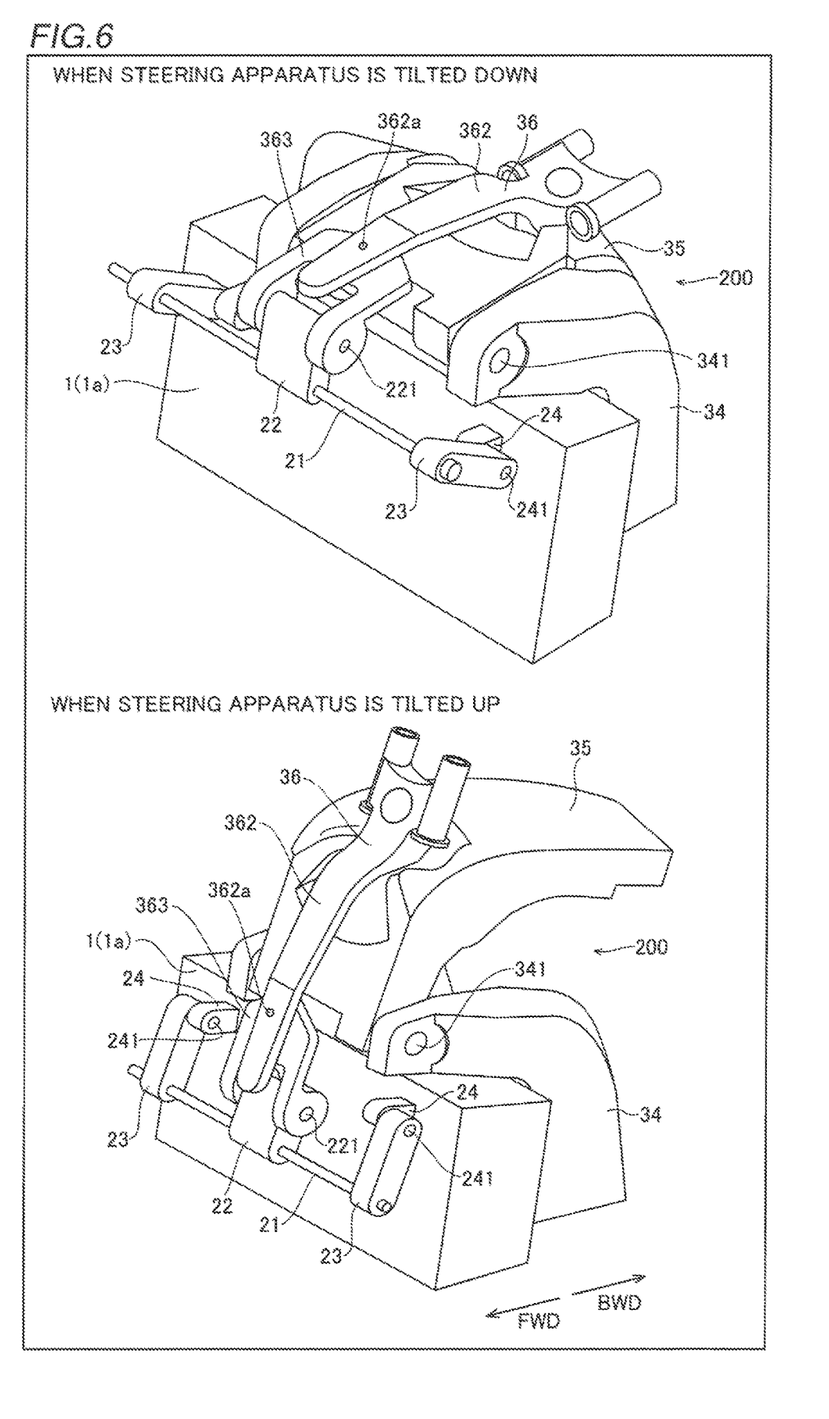
FIG. 6 includes perspective views schematically showing states where the steering apparatus of the outboard motor according to a preferred embodiment of the present invention is tilted down and tilted up.

The support brackets 23 support the guide 21 such that the guide 21 rotates about the second pivot shafts 241 parallel or substantially parallel to the tilt shafts 341, as shown in FIG. 7. First ends of the support brackets 23 are rotatably supported by the second pivot shafts 241, and second ends of the support brackets 23 support the guide 21. As shown in FIG. 3, a pair of support brackets 23 are provided on both ends of the guide 21. The pair of support brackets 23 are arranged outward relative to a pair of mounting members 24. The support brackets 23 are rotated downward about the second pivot shafts 241 when the outboard motor 3 is tilted up, as shown in FIGS. 6 and 7. FIG. 6 is simplified for ease of understanding of rotation of the guide 21 when the outboard motor 3 is tilted up. Particularly, the guide 21, the moving body 22, the support brackets 23, and the mounting members 24 are simplified.

The mounting members 24 are fixed to the boat body 1 (transom 1a), as shown in FIG. 3. In other words, the second pivot shafts 241 of the mounting members 24 do not move with respect to the boat body 1. Specifically, the mounting members 24 (second pivot shafts 241) are fixed to the boat body 1 by the fixing members 342 that fix the clamp brackets 34 to the boat body 1. In other words, the mounting members 24 are fastened together to a surface opposite to a side surface of the transom 1a on which the clamp brackets 34 are mounted by the fixing members 342 such as bolts. The second pivot shafts 241 are offset relative to the tilt shafts 341. Specifically, the second pivot shafts 241 are offset forward and downward relative to the tilt shafts 341.

The electric actuator 25 drives the moving body 22. Specifically, the electric actuator 25 rotates the guide 21 through the speed reducer 26 and drives (moves) the moving body 22 right and left. The electric actuator 25 is arranged coaxially with the guide 21. Operation of the electric actuator 25 is feedback-controlled based on the rotation of the guide 21 detected by the sensor 27. As shown in FIG. 5, the electric actuator 25 overlaps with a portion of the outboard motor 3 in a side elevational view when the outboard motor 3 is fully tilted up. In FIG. 5, the electric actuator 25 overlaps with a portion of a bottom cowling in the side elevational view.

As shown in FIG. 3, the clamp brackets 34 of the outboard 3 are fixed to the transom 1a of the boat body 1. Specifically, a pair of clamp brackets 34 are arranged to hold the swivel bracket 35 therebetween in the right-left direction. The clamp brackets 34 are fixed to the rear portion of the boat body 1 by the fixing members 342. The clamp brackets 34 are fixed to the boat body 1 by a plurality of fixing members 342 through mounting holes provided in the transom 1a in the rear portion of the boat body 1.

The swivel bracket 35 is rotatably supported by the clamp brackets 34 through the tilt shafts 341 that extend horizontally or substantially horizontally. The swivel bracket 35 is rotated with respect to the clamp brackets 34 by driving the tilt-trim apparatus 7. Thus, the outboard motor 3 is tilted up and tilted down, and trim adjustments are made.

The steering arm 36 is rotatably supported by the swivel bracket 35 through the steering shaft 351 orthogonal or substantially orthogonal to the tilt shafts 341. A first end of the steering arm 36 is coupled to the outboard motor 3, and a second end of the steering arm 36 is coupled to the steering mechanism 2. Specifically, the mount 361 (see FIG. 5) of the steering arm 36 supports the outboard motor 3. The first arm 362 of the steering arm 36 is connected to the mount 361. The second arm 363 is rotatably coupled to the first arm 362 through a rotation shaft 362a orthogonal or substantially orthogonal to the first pivot shaft 221, as shown in FIG. 3. The second arm 363 is coupled to the moving body 22 (steering mechanism 2) through the first pivot shaft 221.

According to this preferred embodiment, when the outboard motor 3 is tilted up, as shown in FIGS. 6 to 8, the swivel bracket 35 is rotated about the tilt shafts 341, and the guide 21 is rotated about the second pivot shafts 241. The second pivot shafts 241 are arranged forward relative to and below the tilt shafts 341. The rotation radius A2 (see FIG. 7) of the guide 21 about the second pivot shafts 241 is smaller than the length A1 (see FIG. 7) of the arms (the first arm 362 and the second arm 363). In other words, the rotation angle β of the guide 21 (support brackets 23) about the tilt shafts 341 is smaller than the rotation angle α of the swivel bracket 35 about the tilt shafts 341 when the outboard motor 3 is fully tilted up, as shown in FIG. 8.

Figure 9:
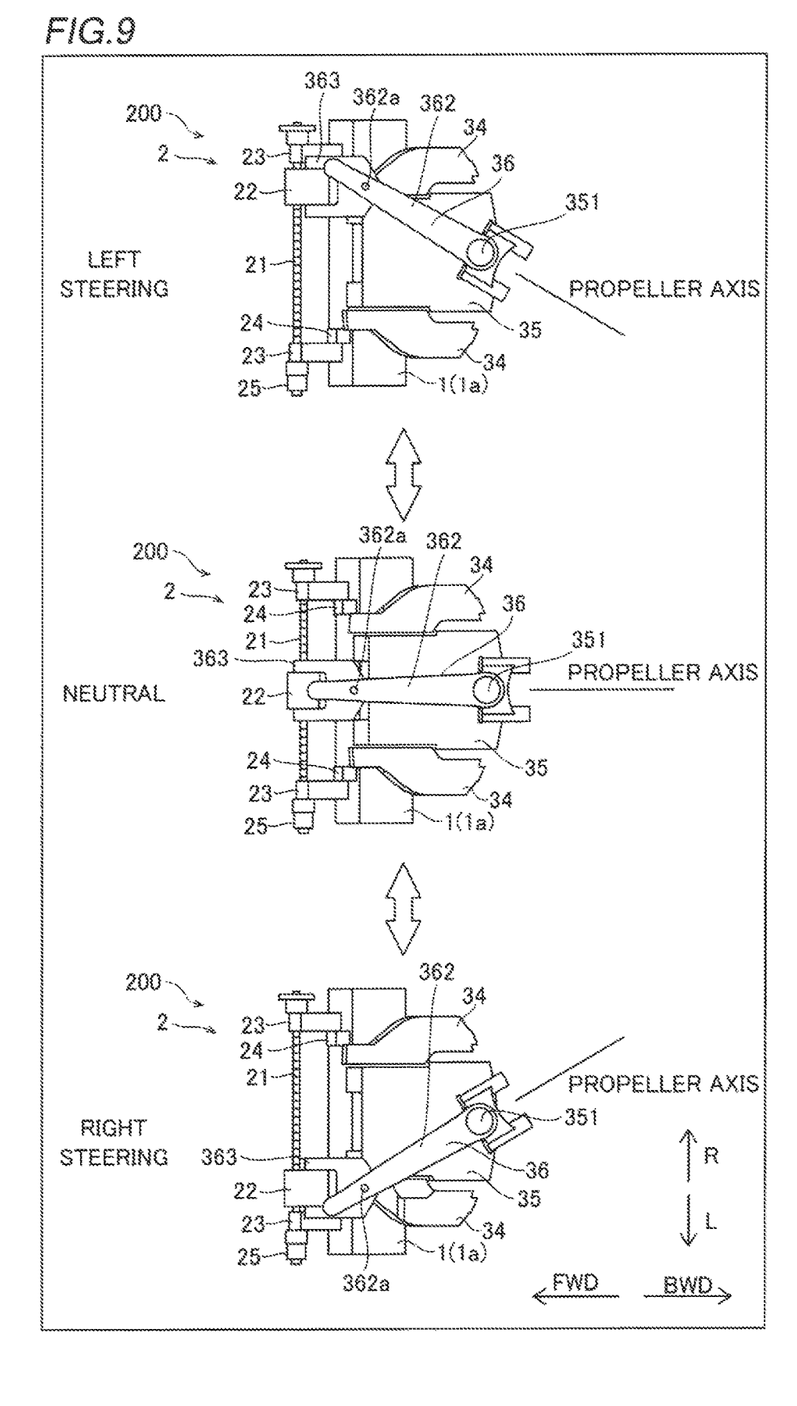
FIG. 9 illustrates turning of the outboard motor by the steering apparatus according to a preferred embodiment of the present invention.

Operation of the steering apparatus 200 is now described with reference to FIG. 9.

When the steering wheel 4 is operated to a neutral position, the moving body 22 is moved to a central or substantially central portion of the guide 21. In other words, the electric actuator 25 rotates the guide 21 (ball screw), and the moving body 22 (ball nut 222) is moved to a central or substantially central portion of the guide 21. The propeller axis of the outboard motor 3 is directed in a front-back direction through the steering arm 36 by the movement of the moving body 22.

When the steering wheel 4 is operated in a left steering direction, the moving body 22 is moved right relative to the center of the guide 21. In other words, the electric actuator 25 rotates the guide 21 (ball screw), and the moving body 22 (ball nut 222) is moved right relative to the center of the guide 21. The propeller axis of the outboard motor 3 is directed left and rearward through the steering arm 36 by the movement of the moving body 22.

When the steering wheel 4 is operated in a right steering direction, the moving body 22 is moved left relative to the center of the guide 21. In other words, the electric actuator 25 rotates the guide 21 (ball screw), and the moving body 22 (ball nut 222) is moved left relative to the center of the guide 21. The propeller axis of the outboard motor 3 is directed right and rearward through the steering arm 36 by the movement of the moving body 22.

According to various preferred embodiments of the present invention, the following advantageous effects are obtained.

According to a preferred embodiment of the present invention, the guide 21 is arranged forward relative to and parallel or substantially parallel to the tilt shafts 341. Thus, no space to arrange the guide 21 is provided above the tilt shafts 341, and hence an increase in a distance from the tilt shafts 341 to the engine case 31 of the outboard motor 3 is significantly reduced or prevented. Consequently, an increase in an overhang of the outboard motor 3 in the boat is significantly reduced or prevented when the outboard motor 3 is tilted up. The support brackets are provided that support the guide such that the guide rotates about the second pivot shafts parallel or substantially parallel to the tilt shafts. Thus, the guide 21 is rotated about the second pivot shafts 241 when the outboard motor 3 is tilted up, and hence the outboard motor 3 is tilted up while the guide 21 arranged forward relative to the tilt shafts 341 is folded around the second pivot shafts 241. Consequently, the outboard motor 3 is easily fully tilted up while interference of the guide 21 arranged forward relative to the tilt shafts 341 with the boat body 1 is significantly reduced or prevented.

According to a preferred embodiment of the present invention, the second pivot shafts 241 are fixed to the boat body 1. Thus, the guide 21 is rotated about the second pivot shafts 241 fixed to the boat body 1 when the outboard motor 3 is tilted up, and hence the interference of the guide 21 with the boat body 1 is easily significantly reduced or prevented even when the outboard motor 3 is fully tilted up.

According to a preferred embodiment of the present invention, the second pivot shafts 241 are fixed to the boat body 1 by the fixing members 342 that fix the clamp brackets 34 to the boat body 1. Thus, an increase in the number of components is significantly reduced or prevented as compared with the case where members that fix the second pivot shafts 241 are provided separately. No mounting hole is provided separately in the boat body 1 to fix the second pivot shafts 241, and hence the second pivot shafts 241 are easily mounted.

According to a preferred embodiment of the present invention, the first arm 362 connected to the mount 361 and the second arm 363 rotatably coupled to the first arm 362 through the rotation shaft 362a orthogonal or substantially orthogonal to the first pivot shaft 221 and coupled to the moving body 22 through the first pivot shaft 221 are provided. Thus, the second arm 363 rotates about the first pivot shaft 221 in a horizontal or substantially horizontal direction, and hence linear movement of the moving body 22 along the guide 21 is converted to rotational movement of the first arm 362 by the rotation shaft while a distance from the first arm 362 to the moving body 22 is adjusted. Consequently, the outboard motor 3 is easily turned by the linear movement of the moving body.

According to a preferred embodiment of the present invention, the moving body 22 includes the arm relief 223 that prevents interference of the tip end of the first arm 362 when the moving body 22 is rotated with respect to the first arm 362. Thus, interference between the tip end of the first arm 362 and the moving body 22 is significantly reduced or prevented when the outboard motor 3 is tilted up, and hence the tilt-up angle is further increased.

According to a preferred embodiment of the present invention, the steering mechanism 2 includes the electric actuator 25 that drives the moving body 22. Thus, the outboard motor 3 is easily turned by the electric actuator 25.

According to a preferred embodiment of the present invention, the output axis of the electric actuator 25 is arranged coaxially with the guide 21. Thus, interference of the electric actuator 25 with the boat body 1 is significantly reduced or prevented when the outboard motor 3 is tilted up, unlike the case where the output axis of the electric actuator 25 is largely spaced apart in a direction orthogonal to the axis of the guide 21.

According to a preferred embodiment of the present invention, the guide 21 includes the ball screw, and the moving body 22 includes the ball nut 222. Thus, the moving body 22 is easily moved by rotation of the ball screw of the guide 21.

According to a preferred embodiment of the present invention, the electric actuator 25 overlaps with a portion of the outboard motor 3 in the side elevational view when the outboard motor 3 is fully tilted up. Thus, the tilt-up angle of the outboard motor 3 is increased as compared with the case where a portion of the outboard motor 3 does not overlap with the electric actuator 25 in the side elevational view.

According to a preferred embodiment of the present invention, the support brackets 23 are configured to be rotated downward about the second pivot shafts 241 when the outboard motor 2 is fully tilted up. Thus, the guide 21 is moved downward by the downward rotation of the support brackets 23 when the outboard motor 3 is fully tilted up, and hence interference of the guide 21 with the outboard motor 3 arranged above the guide 21 is easily significantly reduced or prevented.

According to a preferred embodiment of the present invention, the rotation angles of the support brackets 23 about the tilt shafts 341 are smaller than the rotation angle of the swivel bracket 35 about the tilt shafts 341 when the outboard motor 3 is fully tilted up. Thus, the interference of the guide 21 supported by the support brackets 23 with the boat body 1 is effectively significantly reduced or prevented when the outboard motor 3 is fully tilted up.

According to a preferred embodiment of the present invention, the rotation radius A2 of the guide 21 about the second pivot shafts 241 is smaller than the length A1 of the arms (the first arm 362 and the second arm 363). Thus, the guide 21 is rotated in a space-saving manner when the outboard motor 3 is tilted up, and hence a large space is ensured in the boat while an increase in a region where the guide 21 is moved is significantly reduced or prevented.

According to a preferred embodiment of the present invention, the pair of support brackets 23 are provided on both ends of the guide 21. Thus, both ends of the guide 21 are supported by the pair of support brackets 23, and hence the guide 21 is securely supported.

The preferred embodiments of the present invention described above are illustrative in all points and not restrictive. The extent of the present invention is not defined by the above description of the preferred embodiments but by the scope of claims, and all modifications within the meaning and range equivalent to the scope of claims are further included.

For example, while one outboard motor is preferably provided in the outboard motor boat in a preferred embodiment described above, the present invention is not restricted to this. The present invention may alternatively be applied to an outboard motor boat provided with a plurality of outboard motors. In this case, the plurality of outboard motors may be turned by a shared steering apparatus, or a steering apparatus may be provided for each of the plurality of outboard motors and turn the plurality of outboard motors independently.

Figure 10:
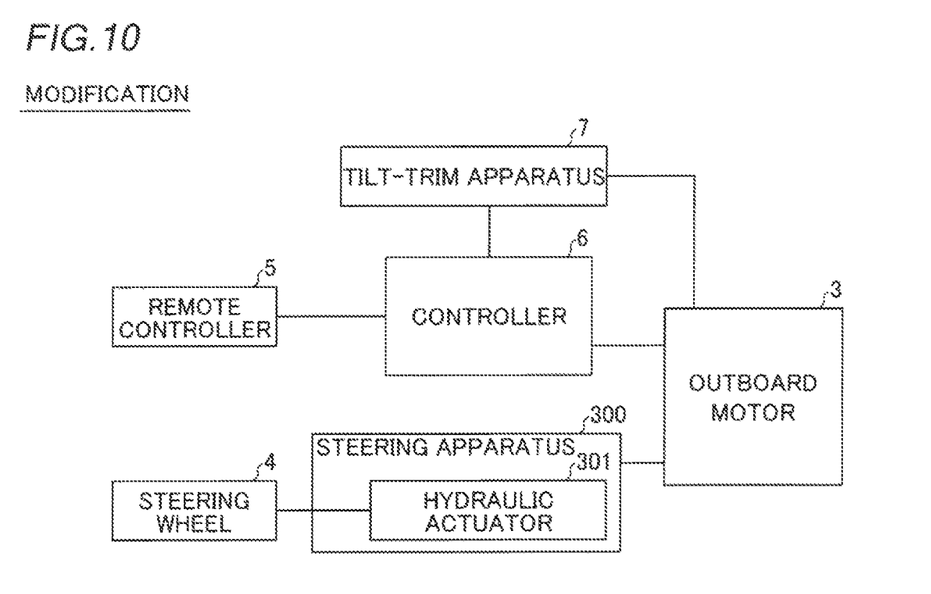
FIG. 10 is a block diagram schematically showing an outboard motor boat according to a modified preferred embodiment of the present invention.

While the electric actuator preferably drives the moving body in a preferred embodiment described above, the present invention is not restricted to this. According to a preferred embodiment of the present invention, as in a modification shown in FIG. 10, a steering apparatus 300 may alternatively include a hydraulic actuator 301 (hydraulic mechanism), and the hydraulic actuator 301 may alternatively drive a moving body.

While the steering apparatus preferably operates based on the operation of the steering wheel in a preferred embodiment described above, the present invention is not restricted to this. According to a preferred embodiment of the present invention, the steering apparatus may alternatively operate based on an operation of other than the steering wheel. For example, the steering apparatus may operate based on the operation of a joystick, a touch panel, or the like.

While the second pivot shafts are preferably fixed to the boat body by the fixing members that fix the clamp brackets to the boat body in a preferred embodiment described above, the present invention is not restricted to this. According to a preferred embodiment of the present invention, the second pivot shafts may alternatively be separately fixed to the boat body without using the fixing members that fix the clamp brackets.

While the ball nut is preferably provided in the moving body, the ball screw is preferably provided in the guide, and the moving body is preferably moved by rotation of the ball screw in a preferred embodiment described above, the present invention is not restricted to this. According to a preferred embodiment of the present invention, the moving body may alternatively be moved with respect to the guide by a mechanism other than a mechanism of the ball screw and the ball nut. For example, the moving body may be moved with respect to the guide by a rack-and-pinion mechanism.

While the steering arm preferably includes the first arm and the second arm coupled to the first arm through the rotation shaft in a preferred embodiment described above, the present invention is not restricted to this. According to a preferred embodiment of the present invention, the steering arm may alternatively include arms integrally provided and coupled to the moving body through an elongated hole.

While driving of the electric actuator is preferably transmitted to the guide through the speed reducer in a preferred embodiment described above, the present invention is not restricted to this. According to a preferred embodiment of the present invention, driving of the electric actuator may alternatively be transmitted to the guide not through the speed reducer.

While the output axis of the electric actuator is preferably arranged coaxially with the guide in a preferred embodiment described above, the present invention is not restricted to this. According to a preferred embodiment of the present invention, the output axis of the electric actuator may alternatively be deviated from the axis of the guide.

While the sensor that detects rotation of the guide is preferably provided in a preferred embodiment described above, the present invention is not restricted to this. According to a preferred embodiment of the present invention, no sensor that detects rotation of the guide is provided. For example, an encoder may be provided in the electric actuator and detect rotation of the electric actuator.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steering apparatus for an outboard motor, the steering apparatus comprising:
    a clamp bracket capable of being fixed to a boat body;
    a swivel bracket rotatably supported by the clamp bracket through a tilt shaft that extends horizontally or substantially horizontally;
    a steering arm rotatably supported by the swivel bracket through a steering shaft that is orthogonal or substantially orthogonal to the tilt shaft; and
    a steering mechanism coupled to the steering arm; wherein
    the steering arm includes a mount that supports the outboard motor and an arm that extends from the mount toward the boat body and is coupled to the steering mechanism; and
    the steering mechanism includes a guide arranged forward relative to, and parallel or substantially parallel to the tilt shaft, a moving body rotatably coupled to the arm through a first pivot shaft spaced apart from the guide and parallel or substantially parallel to the tilt shaft and movable along the guide, and a support bracket that supports the guide such that the guide rotates about a second pivot shaft parallel or substantially parallel to the tilt shaft and offset relative to the tilt shaft and the guide.

2. The steering apparatus for an outboard motor according to claim 1, wherein the second pivot shaft is offset downward relative to the tilt shaft.

3. The steering apparatus for an outboard motor according to claim 2, wherein the second pivot shaft is offset forward and downward relative to the tilt shaft.

4. The steering apparatus for an outboard motor according to claim 1, wherein the arm includes a first arm connected to the mount and a second arm rotatably coupled to the first arm through a rotation shaft orthogonal or substantially orthogonal to the first pivot shaft and coupled to the moving body through the first pivot shaft.

5. The steering apparatus for an outboard motor according to claim 1, wherein the steering mechanism further includes a hydraulic mechanism that drives the moving body.

6. The steering apparatus for an outboard motor according to claim 1, wherein the steering mechanism includes an electric actuator that drives the moving body.

7. The steering apparatus for an outboard motor according to claim 6, wherein an output axis of the electric actuator is coaxial with the guide.

8. The steering apparatus for an outboard motor according to claim 7, wherein the guide includes a ball screw, and the moving body includes a ball nut.

9. The steering apparatus for an outboard motor according to claim 6, wherein the electric actuator overlaps with a portion of the outboard motor in a side elevational view when the outboard motor is fully tilted up.

10. The steering apparatus for an outboard motor according to claim 1, wherein the support bracket is rotatable downward about the second pivot shaft when the outboard motor is fully tilted up.

11. The steering apparatus for an outboard motor according to claim 10, wherein a rotation angle of the support bracket about the tilt shaft is smaller than a rotation angle of the swivel bracket about the tilt shaft when the outboard motor is fully tilted up.

12. The steering apparatus for an outboard motor according to claim 1, wherein a rotation radius of the guide about the second pivot shaft is smaller than a length of the arm.

13. The steering apparatus for an outboard motor according to claim 1, wherein the support bracket includes a pair of support brackets provided on both ends of the guide.

14. An outboard motor boat comprising:
    a boat body; and
    a steering apparatus for an outboard motor mounted on the boat body; wherein the steering apparatus for the outboard motor includes:
    a clamp bracket fixed to the boat body;
    a swivel bracket rotatably supported by the clamp bracket through a tilt shaft extends horizontally or substantially horizontally;
    a steering arm rotatably supported by the swivel bracket through a steering shaft orthogonal or substantially orthogonal to the tilt shaft; and
    a steering mechanism coupled to the steering arm; wherein
    the steering arm includes a mount that supports the outboard motor and an arm that extends from the mount toward the boat body and is coupled to the steering mechanism; and
    the steering mechanism includes a guide arranged forward relative to and parallel or substantially parallel to the tilt shaft, a moving body rotatably coupled to the arm through a first pivot shaft spaced apart from the guide and parallel or substantially parallel to the tilt shaft and movable along the guide, and a support bracket that supports the guide such that the guide rotates about a second pivot shaft parallel or substantially parallel to the tilt shaft and offset relative to the tilt shaft and the guide.

15. A steering apparatus for an outboard motor, the steering apparatus comprising:
    a clamp bracket capable of being fixed to a boat body;
    a swivel bracket rotatably supported by the clamp bracket through a tilt shaft that extends horizontally or substantially horizontally;
    a steering arm rotatably supported by the swivel bracket through a steering shaft that is orthogonal or substantially orthogonal to the tilt shaft; and
    a steering mechanism coupled to the steering arm; wherein
    the steering arm includes a mount that supports the outboard motor and an arm that extends from the mount toward the boat body and is coupled to the steering mechanism;
    the steering mechanism includes a guide arranged forward relative to, and parallel or substantially parallel to the tilt shaft, a moving body rotatably coupled to the arm through a first pivot shaft parallel or substantially parallel to the tilt shaft and movable along the guide, and a support bracket that supports the guide such that the guide rotates about a second pivot shaft parallel or substantially parallel to the tilt shaft and offset relative to the tilt shaft; and the second pivot shaft capable of being fixed to the boat body.

16. The steering apparatus for an outboard motor according to claim 15, wherein the second pivot shaft is capable of being fixed to the boat body by a fixing member that fixes the clamp bracket to the boat body.

17. A steering apparatus for an outboard motor, the steering apparatus comprising:

a clamp bracket capable of being fixed to a boat body;

a swivel bracket rotatably supported by the clamp bracket through a tilt shaft that extends horizontally or substantially horizontally;

a steering arm rotatably supported by the swivel bracket through a steering shaft that is orthogonal or substantially orthogonal to the tilt shaft; and a steering mechanism coupled to the steering arm; wherein the steering arm includes a mount that supports the outboard motor and an arm that extends from the mount toward the boat body and is coupled to the steering mechanism;

the steering mechanism includes a guide arranged forward relative to, and parallel or substantially parallel to the tilt shaft, a moving body rotatably coupled to the arm through a first pivot shaft parallel or substantially parallel to the tilt shaft and movable along the guide, and a support bracket that supports the guide such that the guide rotates about a second pivot shaft parallel or substantially parallel to the tilt shaft and offset relative to the tilt shaft; and the moving body includes an arm relief that prevents interference of a tip end of the arm when the moving body is rotated with respect to the arm.

* * * * *